(12) United States Patent
Kodama et al.

(10) Patent No.: US 8,176,851 B2
(45) Date of Patent: May 15, 2012

(54) SMALL GAS GENERATOR FOR GAS ACTUATOR AND PRETENSIONER SYSTEM

(75) Inventors: Ryoi Kodama, Himeji (JP); Eishi Sato, Himeji (JP); Hirokazu Yoshida, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 241 days.

(21) Appl. No.: 12/160,937

(22) PCT Filed: Jan. 17, 2007

(86) PCT No.: PCT/JP2007/050599
§ 371 (c)(1),
(2), (4) Date: Jul. 15, 2008

(87) PCT Pub. No.: WO2007/083663
PCT Pub. Date: Jul. 26, 2007

(65) Prior Publication Data
US 2010/0186615 A1    Jul. 29, 2010

(30) Foreign Application Priority Data

Jan. 18, 2006  (JP) ................. 2006-010185

(51) Int. Cl.
*C06D 5/00*     (2006.01)
*B01J 7/00*     (2006.01)
*B60R 21/26*    (2011.01)

(52) U.S. Cl. ........................................ 102/530; 280/741

(58) Field of Classification Search .............. 102/530, 102/531; 280/741; 149/46, 61
See application file for complete search history.

(56) References Cited

U.S. PATENT DOCUMENTS

| | | | | |
|---|---|---|---|---|
| 2,434,872 A * | 1/1948 | Taylor et al. | ..................... | 149/46 |
| 3,062,146 A * | 11/1962 | Williams et al. | ........... | 102/202.9 |
| 5,551,725 A * | 9/1996 | Ludwig | ......................... | 280/737 |
| 5,756,929 A * | 5/1998 | Lundstrom et al. | ............. | 149/22 |
| 6,024,812 A * | 2/2000 | Bley et al. | ....................... | 149/92 |
| 6,143,103 A * | 11/2000 | Ryder | ............................... | 149/46 |
| 6,682,616 B1 * | 1/2004 | Yamato et al. | .................. | 149/45 |
| 6,918,976 B2 * | 7/2005 | Sato et al. | .................... | 149/19.1 |

(Continued)

FOREIGN PATENT DOCUMENTS

CN    1678879 A    10/2005

(Continued)

OTHER PUBLICATIONS

Japanese Office Action with English translation issued Oct. 11, 2011, in Japanese Patent Application No. 2007-554918, 10 pages.

*Primary Examiner* — Bret Hayes
(74) *Attorney, Agent, or Firm* — Oblon, Spivak, McClelland, Maier & Neustadt, L.L.P.

(57) ABSTRACT

A gas generator including a cup filled with gas generant molded articles that generate gas by combustion, and an ignitor on which an ignition agent is disposed. Each gas generant molded article is formed of smokeless powders containing nitrocellulose as its major ingredient. Each gas generant molded article includes an explosive containing a fuel agent containing a guanidine derivative and/or a tetrazole derivative and an oxidizing agent containing a metal nitrate and/or perchlorate. Thus, it is possible to provide a gas generator by which the amount of CO gas generated in operation can be reduced and the combustion speed can easily be controlled, and to provide a pretensioner system provided with the gas generator.

22 Claims, 2 Drawing Sheets

U.S. PATENT DOCUMENTS

| | | |
|---|---|---|
| 7,178,831 B2 | 2/2007 | Yoshida et al. |
| 7,467,588 B2 * | 12/2008 | Matsuda et al. ............. 102/530 |
| 2002/0017778 A1 * | 2/2002 | Katsuda et al. ............. 280/741 |
| 2003/0137139 A1 * | 7/2003 | Iwai et al. .................... 280/741 |
| 2004/0053182 A1 | 3/2004 | Yoshida et al. |
| 2004/0069383 A1 * | 4/2004 | Sato et al. ...................... 149/78 |
| 2006/0208474 A1 * | 9/2006 | Kubo et al. ................... 280/806 |
| 2011/0169254 A1 * | 7/2011 | Bert .............................. 280/741 |

FOREIGN PATENT DOCUMENTS

| | | |
|---|---|---|
| EP | 1 541 958 A1 | 6/2005 |
| JP | 2000 119088 | 4/2000 |
| JP | 2001 88653 | 4/2001 |
| JP | 2002 12492 | 1/2002 |
| WO | 2004 025210 | 3/2004 |
| WO | 2004 048296 | 6/2004 |

* cited by examiner

SMALL GAS GENERATOR FOR GAS ACTUATOR AND PRETENSIONER SYSTEM

TECHNICAL FIELD

The present invention relates to a small gas generator for a gas actuator, and a pretensioner system using the generator to be installed in a car, an aircraft, or the like for protecting the occupants.

BACKGROUND ART

Conventionally, a vehicle such as a car is equipped with safety devices such as seatbelts and airbags for protecting its driver and passengers from the shock at the time of a collision. Recently, to further improve the safety, pretensioner systems are becoming widely used in which an urgently-drawing device called pretensioner is disposed in a seatbelt winding system for winding up a seatbelt; and the seatbelt is instantaneously drawn by the pretensioner to restrain the body of an occupant so as not to collide with a steering wheel or the like. In such a pretensioner, because it is required to instantaneously wind up the seat belt, a gyro-type gas generator is used for a power source. More specifically, a piston is instantaneously moved in a cylinder by gas generated by combustion of gas generants in the gas generator. In conjunction with the piston, power is supplied to the pretensioner.

In many recent vehicles and so on, such pretensioner systems are used for all occupants. This increases the number of pretensioners installed in one vehicle or the like, and accordingly increases the number of gas generators installed. Therefore, gas generants to be used in such a gas generator have been desired that generate no CO gas or a smaller amount of CO gas. For example, the below Patent Documents 1 and 2 disclose gas generant compositions to solve the above problem.

Patent Document 1: Japanese Patent Unexamined Publication No. 2000-119088
Patent Document 2: Japanese Patent Unexamined Publication No. 2002-12492

DISCLOSURE OF THE INVENTION

The Problem to be Solved by the Invention

However, each of the gas generant compositions disclosed in the above Patent Documents 1 and 2 is a gas generant composition in which two or more ingredients have been mixed. In use, the composition is formed into one kind of molded articles. There is obtained only a certain combustion speed. Therefore, in the gas generator including in its combustion chamber the molded articles of the gas generant composition disclosed in the above Patent Document 1 or 2, the combustion speed can not be changed though no CO gas or only a small amount of CO gas is generated. As a result, the strength for drawing by the pretensioner can not be controlled.

An object of the present invention is to provide a small gas generator for a gas actuator and a pretensioner system using the generator, wherein the amount of CO gas to be generated in operation can be reduced, and the combustion speed can easily be controlled.

Means for Solving the Problem

According to the present invention provided is a small gas generator for a gas actuator for operating a safety device. The gas generator has a combustion chamber for generating gas. The gas generator includes, in the combustion chamber, first gas generant molded articles containing a fuel component including a guanidine derivative and/or a tetrazole derivative, and an oxidizing agent component containing a metal nitrate and/or a perchlorate; and second gas generant molded articles containing smokeless powders including nitrocellulose as a major ingredient.

In the small gas generator for a gas actuator of the present invention, it is preferable that the metal nitrate is a salt of a metal selected out of alkali metals and alkali earth metals, and the perchlorate contains ammonium perchlorate or potassium perchlorate.

In the small gas generator for a gas actuator of the present invention, it is preferable that the fuel agent contains one or more selected out of nitroguanidine, guanidine nitrate, bitetrazole, azobistetrazole, and 5-aminotetrazole, and the oxidizing agent is a mixture of ammonium perchlorate and strontium nitrate, or potassium perchlorate, and further contains a binder.

In the small gas generator for a gas actuator of the present invention, the binder preferably contains a mixture of hydroxypropylmethylcellulose and polyacrylamide.

In the small gas generator for a gas actuator of the present invention, it is preferable that each first gas generant molded article further contains an additive, and the content of the fuel agent is 20 to 55% by weight; the content of the oxidizing agent is 40 to 70% by weight; the content of the binder is 2 to 10% by weight; and the content of the additive is 2 to 10% by weight, which are controlled so that the total of the fuel agent, the oxidizing agent, the binder, and the additive is 100% by weight.

In the small gas generator for a gas actuator of the present invention, the ratio Av/Bv between the volume Av of one first gas generant molded article and the volume Bv of one second gas generant molded article is preferably 1.2 to 1.5. Or, the ratio Aw/Bw between the whole weight Aw of the first gas generant molded articles and the whole weight Bw of the second gas generant molded articles is preferably 0.5 to 2.0. Or, the ratio (dPA/dt)/(dPB/dt) between the combustion speed dPA/dt of the first gas generant molded articles and the combustion speed dPB/dt of the second gas generant molded articles is preferably 0.3 to 1.5, more preferably, 0.5 to 1.0.

A pretensioner system of the present invention is provided with the above-described small gas generator for a gas actuator.

Effect of the Invention

According to the present invention, a small gas generator for a gas actuator can be provided in which the amount of CO gas generated in operation can be reduced and the combustion speed can easily be controlled. In addition, in a pretensioner system provided with the small gas generator for a gas actuator, the strength for drawing by the pretensioner can be controlled during the operation.

In the small gas generator for a gas actuator of the present invention, because the second gas generant molded articles contain smokeless powders including nitrocellulose as its major ingredient, which is lower in ignition temperature than the first gas generant molded articles, the smokeless powders are autoignited when heated to its ignition temperature. Therefore, when the small gas generator itself for a gas actuator is designed so as not to be broken till a predetermined temperature more than the ignition temperature of the smokeless powder, the gas generant can have burned before the small gas generator for a gas actuator is broken at the time of a fire or the like. This prevents an accidental firing at the time of the break.

BEST MODE FOR CARRYING OUT THE INVENTION

Next will be described a small gas generator for a gas actuator according to an embodiment of the present invention (hereinafter may be simply referred to as gas generator). FIG. 1 is a sectional view of the gas generator according to the embodiment of the present invention.

In FIG. 1, the gas generator 1 is a small-size device including a cup 3 filled with gas generant molded articles 2 and 7 that generate gas by combustion; an ignitor 4 on which an ignition agent 10 is disposed; and a holder 5 to which the cup 3 and the ignitor 4 are fixed. The gas generator 1 is used in a seatbelt pretensioner or the like. By making necessary changes to the gas generator 1, it can be used with the ignitor 4 as a gas generator for an airbag; a gas generator for flipping up a bonnet; a gas generator for flipping up a front end portion of a seat; or the like.

The cup 3 includes a large-diameter cylindrical portion 3a; and a bottomed tubular portion 3b formed continuously from the cylindrical portion 3a and having two parallel flat side faces. A plurality of gas generant molded articles 2 are included in the cup 3. On the bottom face of the bottomed tubular portion 3b, six cutouts 3c are formed so as to extend radially from the center of the bottom face. When the gas generant molded articles 2 burn in the cup 3 to generate high-temperature and high-pressure gas, the cutouts 3c are broken by the pressure of the gas. The gas is thereby directly released into a not-shown seatbelt pretensioner. A flange 3d is formed around the opening of the cup 3 for attaching the cup 3 to a holder 5 as will be described later. The cup 3 is formed of, for example, metal such as stainless steel, iron, or aluminum.

Each of the gas generant molded articles 2 and 7 is preferably shaped into a granular form, a flake form, a pellet form, a tablet form, a multiperforated cylinder form, a cylindrical form, a single perforated cylinder form, or the like. They are mixed with each other to fill up the cup 3 independently in a dispersed state so as to be able to come into direct contact with the inner circumferential surface of the cup 3 without passing through a filter or/and a coolant. By changing the ratio Av/Bv between the volume Av of one gas generant molded article 7 and the volume Bv of one gas generant molded article 2, the combustion speed can be changed. The smaller the value of the ratio Av/Bv, the slower the initial combustion speed. Conversely, the larger the value of the ratio Av/Bv, the faster the combustion speed. To obtain a desired rate, the ratio Av/Bv has been controlled to 1.2 to 15. If the ratio Av/Bv is not less than 15, the initial combustion speed is too fast, which can not meet the performance of the gas actuator. On the other hand, by changing the ratio Aw/Bw between the whole weight Aw of the gas generant molded articles 7 and the whole weight Bw of the gas generant molded articles 2, the concentration of generated CO gas and the initial combustion speed can be changed. The smaller the value of the ratio Aw/Bw, the higher the concentration of generated CO gas and the faster the initial combustion speed. Conversely, the larger the value of the ratio Aw/Bw, the lower the concentration of generated CO gas and the slower the initial combustion speed. To obtain a desired concentration of generated CO gas and a desired combustion speed, the ratio Aw/Bw may be controlled to 0.5 to 2.0. On the other hand, by changing the value of the ratio (dPA/dt)/(dPB/dt) between the combustion speed dPA/dt of the gas generant molded articles 7 and the combustion speed dPB/dt of the gas generant molded articles 2, the combustion speed can be changed. For example, by changing the value of the ratio (dPA/dt)/(dPB/dt) from "high" to "low", the combustion speed can be changed from "fast" to "slow". The value of the ratio (dPA/dt)/(dPB/dt) is preferably 0.3 to 1.5, more preferably, 0.5 to 1.0.

Here, the above "combustion speed" was evaluated by respective 10-cc bomb tests for the gas generant molded articles 7 and the gas generant molded articles 2, which can be represented by (dPA/dt) or (dPB/dt). When the each maximum achieving pressure Pmax obtained from the each result of the 10-cc bomb test of first gas generant and second gas generant is considered to be 100%, the combustion speed (dPA/dt) or (dPB/dt) used here means the slope between two points of 30% and 70% the maximum achieving pressure Pmax. When 30% of the maximum achieving pressure Pmax and the time of it are respectively represented by P30 and t30; and 70% of the maximum achieving pressure Pmax and the time of it are respectively represented by P70 and t70, the above combustion speed can be calculated by the following formula, where t30 and t70 represent the time periods from the start of energization to the respective pressures P30 and P70. The combustion speed (dPA/dt) or (dPB/dt)=(P70−P30)/(t70−t30). The 10-cc bomb test is performed as follows. The gas generator 1 is set in a stainless steel tank having its inner volume of 10 cc. A bridge wire 16 connected to an electrode pin 14 (see FIG. 1) is energized to operate the gas generator 1. The pressure of combustion gas generated is measured with a piezoelectric element disposed within the tank.

Each gas generant molded article 2 (second gas generant molded article) is formed of smokeless powders which are containing nitrocellulose as its major ingredient. Each gas generant molded article 7 (first gas generant molded article) is formed of an explosive containing a fuel agent including guanidine derivatives and/or tetrazole derivatives; and an oxidizing agent containing a metal nitrate and/or perchlorate. Examples of the fuel agent include agents containing one or more selected out of nitroguanidine, guanidine nitrate, bitetrazole, azobistetrazole, and 5-aminotetrazole. Examples of the metal nitrate of the oxidizing agent include salts containing cations selected out of alkali metals and alkali earth metals. Examples of the perchlorate of the oxidizing agent include ammonium perchlorate and potassium perchlorate. Examples of the oxidizing agent include agents containing a mixture of ammonium perchlorate and strontium nitrate or a mixture of potassium perchlorate and a binder. Examples of the binder include binders containing a mixture of hydroxypropylmethylcellulose and polyacrylamide. The gas generant molded articles 7 contains 20 to 55% by weight of the fuel agent, 40 to 70% by weight of the oxidizing agent, 2 to 10% by weight of the binder, and 2 to 10% by weight of additives, which is controlled so that the total of the fuel agent, the oxidizing agent, the binder, and the additives is 100% by weight.

The ignitor 4 includes a header 13, two electrode pins for electrifying, a resistive element (bridge wire) 16, an ignition agent 10, and a covering layer covering the ignition agent 10.

Each of the two electrode pins 14 has a terminal portion 14a and a head 25. Each electrode pin 14 penetrates the header 13 formed of a thermosetting resin shaped. Each electrode pin 14 is fixed to the header 13 with an adhesive. Because each electrode pin 14 penetrating the header 13 thus adheres to the header 13, it can suppress infiltration of external moisture. In addition, each electrode pin 14 is prevented from coming out from the header 13 at the time of a fire of the like. Examples of the material of each electrode pin 14 include an alloy containing nickel; iron; aluminum; copper; and stainless steel. The head 25 of each electrode pin 14 is formed integrally with an end of the terminal portion 14a of the electrode pin 14. The head 25 has a function of preventing the electrode pin 14 from coming out from the header 13 even if the fixing of the electrode pin 14 to the header 13 is broken at the time of a fire or the like. The head 25 preferably has a larger diameter than the terminal portion 14a.

The bridge wire 16 is electrically connected to the heads 25 of the two electrode pins 14. More specifically, the bridge wire 16 is bonded by welding to a flat portion of the top face of each head 25. The flat portion provided in the top face of the head 25 of each electrode pin 14 is for facilitating bonding by welding between the head 25 of the electrode pin 14 and the bridge wire 16. Therefore, each head portion may not have its top face the whole of which is flat, and may have its top face only a part of which is flat. Further, each head portion is not always necessary to have the flat portion perpendicular to the central axis of the electrode pin 14, and it may have a flat portion that intersects with the central axis at a predetermined angle.

The ignition agent 10 is disposed on the surface of the header 13 beyond which the head 25 of each electrode pin 14 protrudes, so as to cover the heads 25 of the two electrode pins 14 and the bridge wire 16. The ignition agent 10 is formed into a continuous solid body that covers all of the heads 25, the parts of the terminal portions 14a of the electrode pins 14 protruding beyond the header 13, and the bridge wire 16. The ignition agent 10 is applied to a predetermined portion by a proper applying method, for example, by dipping, or by using a dispenser, and then dried under proper conditions, for example, by heating. The ignition agent 10 is thus formed to be in contact with the surface of the header 13 facing the cup, as a solid body surrounding the heads 25 of the electrode pins 14 and the bridge wire 16.

The ignition agent 10 is formed of a material obtained by mixing an oxidizing agent, a reducing agent, a binder, and additives optionally added. The ignition agent 10 contains the oxidizing agent component and the reducing agent component, and substantially no lead compound. Lead compounds defined here include, in general, inorganic and organic compounds containing lead atoms; and lead itself.

The covering layer 30 is formed of an insulating material containing at least one selected out of a silicone resin, a fluorine resin, an acrylic resin, and an epoxy resin. The covering layer 30 is formed on apart of the surface of the ignition agent 10. Because the covering layer 30 has its thickness matching the performance to be decided from the physical properties of the covering layer 30 formed, no sparks are emitted even when a high voltage is generated due to static electricity or the like between the metal cup 3 including the gas generant molded articles 2 and an electrode pin 4. In addition, because the covering layer 30 is moisture-resistant, the ignition agent does not absorb moisture and thus does not deteriorate. Further, when the ignition agent 10 is ignited and burns, the covering layer 30 does not remain partially as a lump without burning, and does not block the transmission of fire to the gas generant molded articles 2. Therefore, when the gas generator 1 is used as an ignitor for a seatbelt pretensioner or an airbag, the seatbelt pretensioner or the airbag can stably be operated. The covering layer 30 is formed by being applied to the surface of the ignition agent 10 by a proper applying method, for example, by dipping, or by using a dispenser or a spray; and then being solidified by a solidifying method matching the material resin of the covering layer 30, for example, by drying and heating.

The header 13 is formed by solidifying a thermosetting resin. Examples of the thermosetting resin include an epoxy resin, a phenol resin, unsaturated polyester, polyurethane, polyimide, and a silicon resin. In particular, an epoxy resin is desirable from the viewpoints of mechanical strength, heat resistance, moisture resistance, electrical characteristics, adhesiveness, and operability. Specific examples of the epoxy resin include polyfunctional epoxy resins as glycidyl ethers of polyphenolic compounds; polyfunctional epoxy resins as glycidyl ethers of various novolac resins; alicyclic epoxy resins; aliphatic epoxy resins; heterocyclic epoxy resins; glycidyl ester epoxy resins; glycidyl amine epoxy resins; and epoxy resins in which halogenated phenols are made into glycidyl.

Two insertion holes 23 are formed in the holder 5. In the two insertion holes 23 inserted are portions of the two electrode pins 14 covered by protrusions 29 of the header 13. Provision of the protrusions 29 of the header 13 prevents electrical short-circuit between the pins and the two insertion holes 23 of the holder 5 due to a metal burr or the like. The area of each of the two insertion holes 23 is preferably small to a certain extent as far as an electrode pin 14 can be inserted. The area of each insertion hole 23 is preferably more than one time and not more than ten times the sectional area of the electrode pin 14 to be inserted in the insertion hole 23. More preferably, the area of each insertion hole 23 falls within the range of two to seven times the sectional area of the electrode pin 14. In this construction of the holder 5, the lower surface of the header 13 is in contact with a recessed end of the holder 5 to be received by the recessed end. Further, because the area of each insertion hole 23 in which an electrode pin 14 is inserted is smaller than that of a conventional ignitor 4, the electrode pin 14 is prevented from coming out from the holder 4 and falling out. Further, because the protrusions 29 are provided on the header 13, the distance between each electrode pin 14 and the holder 5 is the smallest in the insertion hole 23. Therefore, in a static electricity test, the ignition agent 10 is prevented from being ignited due to occurrence of discharge between the electrode pin 14 and the holder 5 when an electrostatic current flows.

A protrusion 5a is formed on the outer circumference of the holder 5. The protrusion 5a is engaged with the flange 3d of the cup 3 so that the cup 3 is tightly fixed to the holder 5. In a middle portion of the holder 5, there are formed a recessed receiving portion 5b for receiving therein the header 13, and an annular protrusion 5c protruding inward from the circumferential end of the receiving portion 5b. The annular protrusion 5c is crimped toward the main body of the holder 5 so as to be in contact with a tapered portion 12 of the header 13 when the header 13 is partially received in the receiving portion 5b. In general, the holder 5 has a substantially bottomed cylindrical shape. The holder 5 can be formed of a metal material such as aluminum, iron, or stainless steel. In particular, aluminum, which is easy to shape, is desirable because the above-described insertion holes 23 and so on must be formed.

Next will be described an operation of the above-described gas generator 1 when applied to a seatbelt pretensioner. When a not-shown collision sensor detects a collision of the car, the bridge wire 16 connected to the two electrode pins 14 is electrified through the electrode pins 14, and thereby the bridge wire 16 generates heats in several milliseconds (ms). Only by the generated heats, the ignition agent 10 is stably ignited and burned. The flame generated by the burning breaks the cover layer 30, and ignites gas generant molded articles 2 existing outside the cover layer 30. Subsequently, when the gas generant molded articles 2 are burning, gas generant molded articles 7 burn. Combustion is thus performed in two stages. Gas generated in the cup 3 by the combustion of the gas generant molded articles 2 and 7 sharply raises the pressure in the cup 3. The cutouts 3*c* formed on the cup 3 are thereby broken. Thus, high-temperature and high-pressure gas is generated to operate the not-shown seatbelt pretensioner.

In this embodiment, the gas generator 1 can be provided that has effects that: (1) the amount of CO gas generated in operation can be reduced because the amount of the gas generant molded articles 2 included in the cup 3 is less; and (2) the combustion speed can be controlled in two steps because the cup 3 is filled with the gas generant molded articles 2 and 7 different in combustion speed. Further, in the pretensioner system including the gas generator 1, although not shown, the strength for drawing by the pretensioner can be controlled during its operation.

Further in the gas generator 1, because each gas generant molded article 2 is formed of smokeless powders which are containing nitrocellulose as its major ingredient, which is lower in ignition temperature than each gas generant molded article 7, the smokeless powders are autoignited when heated to its ignition temperature. Therefore, when the gas generator 1 itself is designed so as not to be broken till a predetermined temperature more than the ignition temperature of the smokeless powder, the gas generant can have burned before the gas generator 1 is broken at the time of a fire or the like. This prevents an accidental firing at the time of the break.

In the present invention, changes in design can be made within a scope not departing from the claims. Thus, the present invention is never limited to the above-described embodiment. For example, in place of the ignitor of the above-described embodiment, a so-called glass squib 34 may be used in a gas generator 31 as shown in FIG. 2. Next, the gas generator 31 will be described in detail.

In the gas generator 31, the ignitor 4 of the gas generator 1 of the first embodiment is replaced by a glass squib 34, and the other components are substantially the same as those of the first embodiment. The same components as the components of the first embodiment denoted by reference numerals 1 to 5 and 7 are denoted by respective reference numerals 31 to 35 and 37, and the description thereof may be omitted.

The glass squib 34 is penetrated by a pair of electrode pins 34*a* and 34*b* each formed of an alloy containing nickel; iron; or stainless steel. The glass squib 34 includes a resin portion 43 formed integrally with a holder 35; a conductive header 38 electrically connected to one electrode pin 34*b* and penetrated by the other electrode pin 34*a* a part of the circumference of which is insulated by an insulator 39; a resistive heating element 44 electrically interconnecting the header 38 and the electrode pin 34*a*; an igniting agent 45 disposed so as to cover the resistive heating element 44 and the header 38; a metal tube 40 sealing the igniting agent 45 together with the header 38; and a cup-like resin case 41 covering the tube 40. The insulator 39 is formed of an insulating material such as glass.

The holder 35 has a large-diameter hole 35*b* and a tapered portion 35*e* for fitting thereon the inserted resin portion 43 of the glass squib 34. From the large-diameter hole 35*b*, the electrode pins 34*a* and 34*b* protrude outward that are fixed through the resin portion 43 (see FIG. 2). On the holder 35 holding the resin portion 43 of the glass squib 34, a seal member 42 such as an O-ring is disposed between the holder 35 and the resin portion 43 for moisture resistance between the glass squib 34 and the holder 35. Although the material of the seal member 42 is not particularly limited, a material such as nitrile, silicone, or ethylene-propylene rubber is desirable, which are hard to be permeable to moisture. The seal member is preferably disposed over the whole circumference of the bonding interface between the holder and the squib.

The resin portion 43 is formed, for example, by injection-molding in a mold (not shown) a resin such as polybutylene terephthalate, polyethylene terephthalate, nylon 6, nylon 66, polyphenylene sulfide, polyphenylene oxide, polyether imide, polyether ether ketone, or polyether sulfone; and those containing glass fibers, carbon, or the like. The electrode pins 34*a* and 34*b* are integrated with the resin portion 43 by putting them in the mold when the resin is injected into the mold.

The header 38 is formed of stainless steel, aluminum, or the like. The resistive heating element 44 one end of which is connected to the header 38 is formed of a nickel-chrome alloy, stainless steel, platinum, or the like.

The tube 40 is formed of a metal material or the like such as iron, aluminum, or stainless steel. The case 41 is formed of a resin or the like such as PBT (polybutylene terephthalate), nylon (registered trademark), or a fluororesin. Around the opening end of the case 41, a flange 41*a* expanded radially outward is formed so as to be fixed to a portion 43*a* of the resin portion 43. Provision of the case 41 prevents an electrostatic current from flowing to the electrode pins 34*a* to 34*b* through the metal holder 35 or the cup case 33 constituting the gas generator 31 to cause an erroneous ignition.

The gas generator 31 brings about the same effects as the above-described embodiment.

In the above modification, a glass squib is described. However, another type of squib may be used that includes a fuse head formed so as to cover the resistive heating element 44 and the header 29, and covered with an igniting agent.

EXAMPLES

Next, the combustion speeds of the gas generant molded articles according to the present invention and the CO concentration in burning will be described by using examples.

Example 1

First and Second Gas Generant Molded Articles Used

First gas generant molded articles were made as follows. In a rocking mixer mixed were 26.7% of ammonium perchlorate, 26.7% of strontium nitrate, 2.8% of iron oxide (magnetite: Fe3O4), 1.9% of copper oxide (CuO), 4.6% of hydroxypropylmethylcellulose, and 1.1% of polyacrylamide. The mixture was then uniformly kneaded in a kneader with adding 36.2% by weight of nitroguanidine and 14% by weight, as a proportion to the whole, of ion-exchange water. The resultant mixture was then extruded by an extruder through a die of diameter phi 1.4 mm under a predetermined pressure to be formed into a predetermined shape. The extruded gas generant was cut into a length of 2.4 mm and then dried. Columnar first gas generant molded articles were thus obtained. For second gas generant molded articles used was a commercially available smokeless powder (shape: diameter phi 0.9 mm and a length of 1.5 mm).

(Combustion Speed Measurement and Co Concentration Measurement)

The combustion speed (30%-70%) dPA/dt of the first gas generant molded articles obtained as described above was measured. For measuring the combustion speed (30%-70%) dPA/dt, 1250 mg of the first gas generant was burnt in a 10-cc bomb test, and the bomb inner pressure at that time was measured with a pressure sensor. On the other hand, for the second gas generant molded articles, like the first gas generant molded articles, 1000 mg of the second gas generant molded articles (smokeless powder) were burnt in a 10-cc bomb test, and the bomb inner pressure at that time was measured with a pressure chamber to measure the combustion speed (30%-70%) dPB/dt. The first gas generant molded articles and the second gas generant molded articles (smokeless powder) were weighed into 750 mg and 600 mg, respectively. A 27-cc tank test was then performed by using a gas generator filled with the gas generant molded articles so that the gas generant volume ratio Av/Bv was 3.9 and the gas generator filling weight ratio Aw/Bw was 1.25. On the other hand, for measuring the CO concentration, the first gas generant molded articles and the second gas generant molded articles (smokeless powder) were weighed into 750 mg and 600 mg, respectively. By using a gas generator filled with them, a 10-cc tank test with a phi-1 mm hole was performed in a 60-L tank. After five minutes elapsed from electrifying, gas generated in the 60-L tank was collected. The collected gas was measured with a Kitagawa type gas detecting tube. Table 1 shows together the measurement results and the composition ratios of the first and second gas generant molded articles.

for the first gas generant molded articles, by using a die of the extruder larger in diameter than that of Example 1, the gas generant was extruded to be formed into a predetermined shape. The extruded gas generant was cut into a length of 2.4 mm and then dried. Columnar first gas generant molded articles were thus obtained.

(Combustion Speed Measurement and Co Concentration Measurement)

The above first gas generant molded articles and the above second gas generant molded articles (smokeless powder) were weighed into 750 mg and 600 mg, respectively. A 27-cc tank test was then performed by using a gas generator filled with the gas generant molded articles so that the gas generant

TABLE 1

|  | Constituent of each gas generant | Composition ratio (wt %) | Gas generant volume ratio Av/Bv | Gas-generating device filling weight ratio Aw/Bw | Combustion speed ratio $(dP_A/dt)/(dP_B/dt)$ | CO concentration (ppm) |
| --- | --- | --- | --- | --- | --- | --- |
| First gas generant compact | nitroguanidine | 36.2 | 3.9 | 1.25 | 0.86 | 2500 |
|  | ammonium perchlorate | 26.7 |  |  |  |  |
|  | strontium nitrate | 26.7 |  |  |  |  |
|  | iron oxide | 2.8 |  |  |  |  |
|  | copper oxide | 1.9 |  |  |  |  |
|  | hydroxypropylmethylcellulose | 4.6 |  |  |  |  |
|  | polyacrylamide | 1.1 |  |  |  |  |
| Second gas generant compact | smokeless explosive | 100 |  |  |  |  |

Example 2

First and Second Gas Generant Molded Articles Used

For the respective first and second gas generant molded articles, the same compositions as Example 1 were used. But, volume ratio Av/Bv was 8.7 and the gas generator filling weight ratio Aw/Bw was 1.25. The CO concentration measurement was performed in the same manner as that of Example 1. Table 2 shows together the measurement results and the composition ratios of the first and second gas generant molded articles.

TABLE 2

| | Constituent of each gas generant | Composition ratio (wt %) | Gas generant volume ratio Av/Bv | Gas-generating device filling weight ratio Aw/Bw | Combustion speed ratio $(dP_A/dt)/(dP_B/dt)$ | CO concentration (ppm) |
|---|---|---|---|---|---|---|
| First gas generant compact | nitroguanidine | 36.2 | 8.7 | 1.25 | 0.56 | 2500 |
| | ammonium perchlorate | 26.7 | | | | |
| | strontium nitrate | 26.7 | | | | |
| | iron oxide | 2.8 | | | | |
| | copper oxide | 1.9 | | | | |
| | hydroxypropylmethylcellulose | 4.6 | | | | |
| | polyacrylamide | 1.1 | | | | |
| Second gas generant compact | smokeless explosive | 100 | | | | |

Example 3

Other than that the same first gas generant molded articles as those of Example 1 and the same smokeless powder of the second gas generant molded articles as that of Example 1 were respectively weighed into 900 mg and 450 mg, and a gas generator filled with them so that the gas generator filling weight ratio Aw/Bw was 2.0, the same 27-cc tank test and the same CO concentration measurement as those of Example 1 were performed. Table 3 shows together the measurement results and the composition ratios of the first and second gas generant molded articles.

TABLE 3

| | Constituent of each gas generant | Composition ratio (wt %) | Gas generant volume ratio Av/Bv | Gas-generating device filling weight ratio Aw/Bw | Combustion speed ratio $(dP_A/dt)/(dP_B/dt)$ | CO concentration (ppm) |
|---|---|---|---|---|---|---|
| First gas generant compact | nitroguanidine | 36.2 | 3.9 | 2.0 | 0.86 | 1500 |
| | ammonium perchlorate | 26.7 | | | | |
| | strontium nitrate | 26.7 | | | | |
| | iron oxide | 2.8 | | | | |
| | copper oxide | 1.9 | | | | |
| | hydroxypropylmethylcellulose | 4.6 | | | | |
| | polyacrylamide | 1.1 | | | | |
| Second gas generant compact | smokeless explosive | 100 | | | | |

Example 4

First and Second Gas Generant Molded Articles Used

First gas generant molded articles were made as follows.

In a rocking mixer mixed were 27.6% of ammonium perchlorate, 27.6% of strontium nitrate, 4.6% of hydroxypropylmethylcellulose, and 1.1% of polyacrylamide. The mixture was then uniformly kneaded in a kneader with adding 39.1% by weight of nitroguanidine and 14% by weight, as a proportion to the whole, of ion-exchange water. The resultant mixture was then extruded by an extruder through a die of diameter phi 1.4 mm under a predetermined pressure to be formed into a predetermined shape. The extruded gas generant was cut into a length of 2.4 mm and then dried. Columnar first gas generant molded articles were thus obtained. For second gas generant molded articles, the same as used in Example 1 was used.

(Combustion Speed Measurement and Co Concentration Measurement)

The above first gas generant molded articles and the above second gas generant molded articles (smokeless powder) were weighed into 750 mg and 600 mg, respectively. A 27-cc tank test was then performed by using a gas generator filled with the gas generant molded articles so that the gas generant volume ratio Av/Bv was 3.9 and the gas generator filling weight ratio Aw/Bw was 1.25. The CO concentration measurement was performed in the same manner as that of Example 1. Table 4 shows together the measurement results and the composition ratios of the first and second gas generant molded articles.

TABLE 4

|  | Constituent of each gas generant | Composition ratio (wt %) | Gas generant volume ratio Av/Bv | Gas-generating device filling weight ratio Aw/Bw | Combustion speed ratio $(dP_A/dt)/(dP_B/dt)$ | CO concentration (ppm) |
| --- | --- | --- | --- | --- | --- | --- |
| First gas generant compact | nitroguanidine | 39.1 | 3.9 | 1.25 | 0.48 | 2200 |
|  | ammonium perchlorate | 27.6 |  |  |  |  |
|  | strontium nitrate | 27.6 |  |  |  |  |
|  | hydroxypropylmethylcellulose | 4.6 |  |  |  |  |
|  | polyacrylamide | 1.1 |  |  |  |  |
| Second gas generant compact | smokeless explosive | 100 |  |  |  |  |

Example 5

First and Second Gas Generant Molded Articles Used

First gas generant molded articles were made as follows. In a rocking mixer mixed were 25.5% of ammonium perchlorate, 25.5% of strontium nitrate, 4.8% of hydroxypropylmethylcellulose, and 1.2% of polyacrylamide. The mixture was then uniformly kneaded in a kneader with adding 43.0% by weight of nitroguanidine and 14% by weight, as a proportion to the whole, of ion-exchange water. The resultant mixture was then extruded by an extruder through a die of diameter phi 1.4 mm under a predetermined pressure to be formed into a predetermined shape. The extruded gas generant was cut into a length of 2.4 mm and then dried. Columnar first gas generant molded articles were thus obtained. For second gas generant molded articles, the same as used in Example 1 was used.

(Combustion Speed Measurement and Co Concentration Measurement)

The above first gas generant and the same second gas generant (smokeless powder) as that of Example 1 were weighed into 750 mg and 600 mg, respectively. A 27-cc tank test was then performed by using a gas generator filled with the gas generants so that the gas generant volume ratio Av/Bv was 3.9 and the gas generator filling weight ratio Aw/Bw was 1.25. The CO concentration measurement was performed in the same manner as that of Example 1. Table 5 shows together the measurement results and the composition ratios of the first and second gas generant molded articles.

TABLE 5

|  | Constituent of each gas generant | Composition ratio (wt %) | Gas generant volume ratio Av/Bv | Gas-generating device filling weight ratio Aw/Bw | Combustion speed ratio $(dP_A/dt)/(dP_B/dt)$ | CO concentration (ppm) |
| --- | --- | --- | --- | --- | --- | --- |
| First gas generant compact | nitroguanidine | 43.0 | 3.9 | 1.25 | 0.37 | 2800 |
|  | ammonium perchlorate | 25.5 |  |  |  |  |
|  | strontium nitrate | 25.5 |  |  |  |  |
|  | hydroxypropylmethylcellulose | 4.8 |  |  |  |  |
|  | polyacrylamide | 1.2 |  |  |  |  |
| Second gas generant compact | smokeless explosive | 100 |  |  |  |  |

Comparative Example 1

The same commercially available smokeless powder (shape: diameter phi 0.9 mm and a length of 1.5 mm) as used in Example 1 was used for second gas generant molded articles. A 27-cc tank test was performed by using a gas generator filled only with 1000 mg of the second gas generant molded articles. The CO concentration measurement was performed in a similar manner to that of Example 1. Table 6 shows together the measurement result and the composition ratio of the second gas generant molded articles.

TABLE 6

| | Constituent of each gas generant | Composition ratio (wt %) | Gas generant volume ratio Av/Bv | Gas-generating device filling weight ratio Aw/Bw | Combustion speed ratio $(dP_A/dt)/(dP_B/dt)$ | CO concentration (ppm) |
|---|---|---|---|---|---|---|
| Second gas generant compact | smokeless explosive | 100 | — | — | — | 5000 |

Comparative Example 2

A 27-cc tank test was performed by using a gas generator filled only with 1250 mg of the same first gas generant molded articles as used in Example 1. The CO concentration measurement was performed in a similar manner to that of Example 1.

TABLE 7

| | Constituent of each gas generant | Composition ratio (wt %) | Gas generant volume ratio Av/Bv | Gas-generating device filling weight ratio Aw/Bw | Combustion speed ratio $(dP_A/dt)/(dP_B/dt)$ | CO concentration (ppm) |
|---|---|---|---|---|---|---|
| First gas generant compact | nitroguanidine | 36.2 | — | — | — | 400 |
| | ammonium perchlorate | 26.7 | | | | |
| | strontium nitrate | 26.7 | | | | |
| | iron oxide | 2.8 | | | | |
| | copper oxide | 1.9 | | | | |
| | hydroxypropylmethylcellulose | 4.6 | | | | |
| | polyacrylamide | 1.1 | | | | |

In Examples 1 to 5, it is found that the amount of CO gas generated in operation can be reduced and the combustion speed can easily be controlled. Contrastingly, in Comparative Examples 1 and 2, it is found that the amount of CO gas generated in operation remains large, or even if it can be reduced, the combustion speed can not be controlled.

Figure 1:
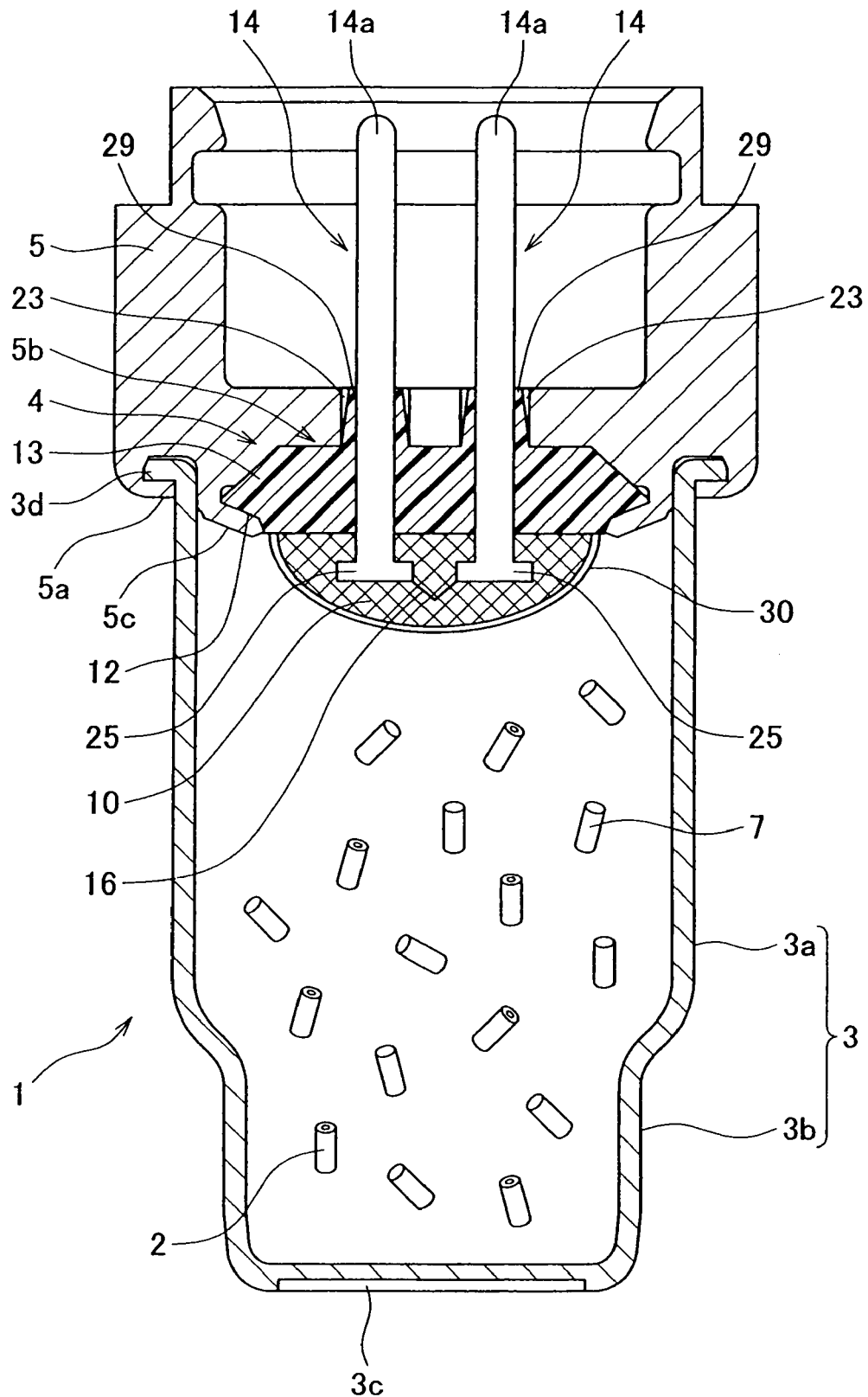
FIG. 1
Figure 2:
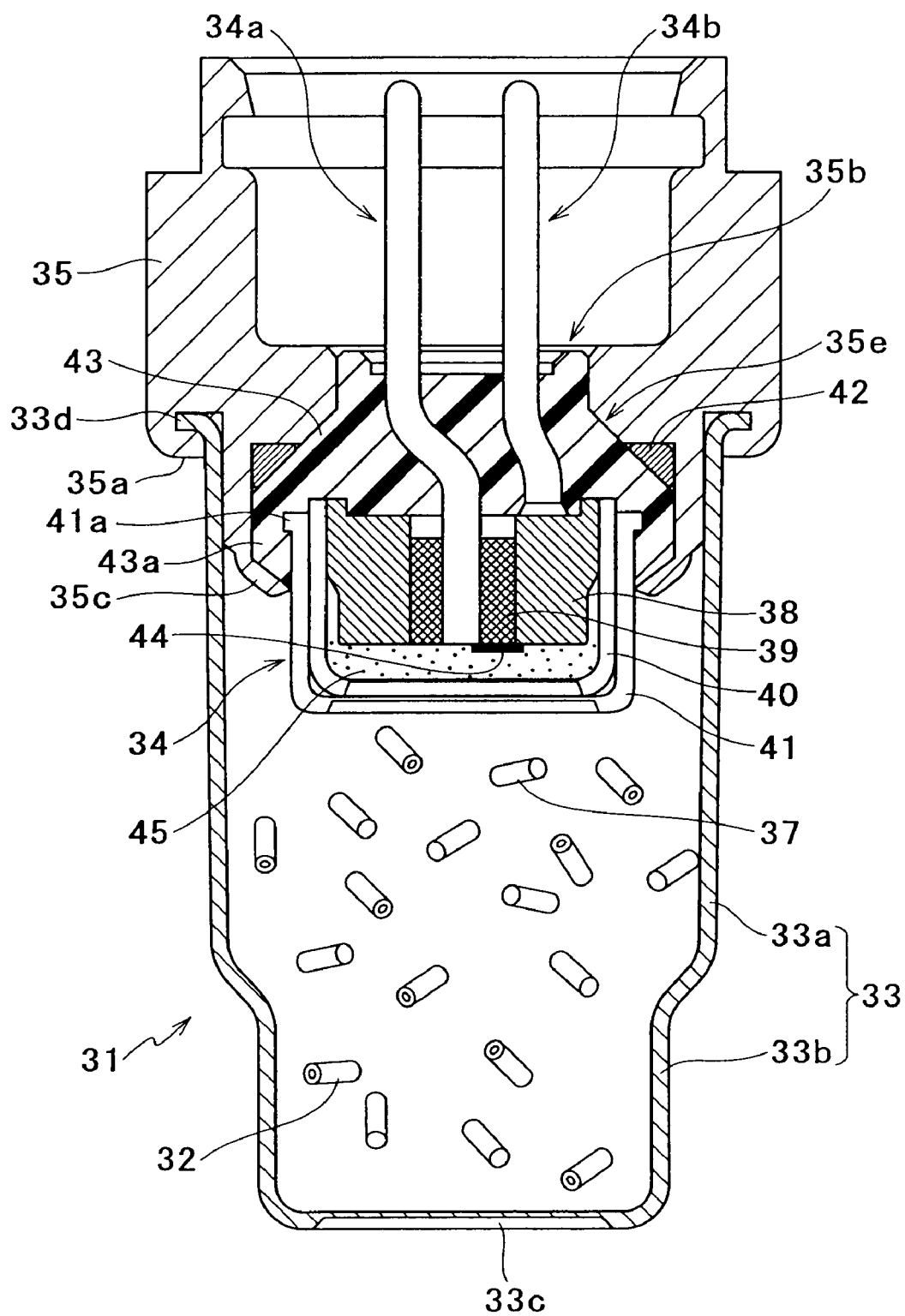

A sectional view of a gas generator according to an embodiment of the present invention.

FIG. 2

A sectional view of a gas generator according to a modification of the embodiment of the present invention.

DESCRIPTION OF REFERENCE NUMERALS 1, 31: Gas generator
2, 32: Second gas generant molded article
3, 33: Cup
3a, 33a: Cylindrical portion
3b, 33b: Bottomed tubular portion
3c, 33c: Cutout
3d, 33d: Flange
4, 34: Ignitor
5, 35: Holder
5a, 35a: Protrusion
5b: Receiving portion
5c, 35c: Annular protrusion
7, 37: First gas generant molded article
10, 45: Ignition agent
12, 35e: Tapered portion
13, 38: Header
14, 34a, 34b: Electrode pin
14a: Terminal portion
16: Bridge wire
23: Insertion hole
25: Head
29: Protrusion
30: Covering layer
39: Insulator
40: Tube
41: Case
44: Resistive heating element

The invention claimed is:

1. A gas generator, having a combustion chamber for generating gas, for a gas actuator for operating a safety device, the generator comprising, in the combustion chamber:
   first gas generant molded articles containing a fuel component including a guanidine derivative and/or a tetrazole derivative, and an oxidizing agent component containing a perchlorate; and
   second gas generant molded articles containing smokeless powders including nitrocellulose as the major ingredient,
   wherein the fuel component of the first gas generant molded articles has a composition different from the fuel component of the second gas generant molded articles, the first and second gas generant molded articles are each shaped in a granular form, a flake form, a pellet form, a tablet form, a multi-perforated cylinder form, a cylindrical form, or a single perforated cylinder form, and are mixed with each other to fill up the combustion chamber.

2. The gas generator according to claim 1, wherein the oxidizing agent component contains a metal nitrate and a perchlorate, wherein the metal nitrate is a salt of a metal selected out of alkali metals and alkali earth metals, and the perchlorate contains ammonium perchlorate or potassium perchlorate.

3. The gas generator according to claim 2, wherein the fuel component of the first gas generant molded articles contains one or more selected out of nitroguanidine, guanidine nitrate, bitetrazole, azobistetrazole, and 5-aminotetrazole, and the oxidizing agent is a mixture of ammonium perchlorate and strontium nitrate, or potassium perchlorate, and further contains a binder.

4. The gas generator according to claim 3, wherein the binder contains a mixture of hydroxypropylmethylcellulose and polyacrylamide.

5. The gas generator according to claim 4, wherein each first gas generant molded article further contains an additive, and a content of the fuel component of the first gas generate molded articles is 20 to 55% by weight; a content of the oxidizing agent is 40 to 70% by weight; a content of the binder is 2 to 10% by weight; and a content of the additive is 2 to 10% by weight, which are controlled so that a total of the fuel component of the first gas generant molded articles, the oxidizing agent, the binder, and the additive is 100% by weight.

6. The gas generator according to claim 2, wherein a ratio Av/Bv between a volume Av of one first gas generant molded article and a volume Bv of one second gas generant molded article is 1.2 to 1.5.

7. The gas generator according to claim 2, wherein a ratio Aw/Bw between a whole weight Aw of the first gas generant molded articles and a whole weight Bw of the second gas generant molded articles is 0.5 to 2.0.

8. The gas generator according to claim 2, wherein a ratio (dPA/dt)/(dPB/dt) between a combustion speed dPA/dt of the first gas generant molded articles and a combustion speed dPB/dt of the second gas generant molded articles is 0.3 to 1.5.

9. The gas generator according to claim 2, wherein a ratio (dPA/dt)/(dPB/dt) between a combustion speed dPA/dt of the first gas generant molded articles and a combustion speed dPB/dt of the second gas generant molded articles is 0.5 to 1.0.

10. A pretensioner system comprising the gas generator according to claim 2.

11. The gas generator according to claim 1, wherein the fuel component of the first gas generant molded articles contains one or more selected out of nitroguanidine, guanidine nitrate, bitetrazole, azobistetrazole, and 5-aminotetrazole, and the oxidizing agent is a mixture of ammonium perchlorate and strontium nitrate, or potassium perchlorate, and further contains a binder.

12. The gas generator according to claim 11, wherein the binder contains a mixture of hydroxypropylmethylcellulose and polyacrylamide.

13. The gas generator according to claim 12, wherein each first gas generant molded article further contains an additive, and a content of the fuel component of the first gas generant molded articles is 20 to 55% by weight; a content of the oxidizing agent is 40 to 70% by weight; a content of the binder is 2 to 10% by weight; and a content of the additive is 2 to 10% by weight, which are controlled so that a total of the fuel component of the first gas generant molded articles, the oxidizing agent, the binder, and the additive is 100% by weight.

14. The gas generator according to claim 1, wherein a ratio Av/Bv between a volume Av of one first gas generant molded article and a volume Bv of one second gas generant molded article is 1.2 to 1.5.

15. The gas generator according to claim 1, wherein a ratio Aw/Bw between a whole weight Aw of the first gas generant molded articles and a whole weight Bw of the second gas generant molded articles is 0.5 to 2.0.

16. The gas generator according to claim 1, wherein a ratio (dPA/dt)/(dPB/dt) between a combustion speed dPA/dt of the first gas generant molded articles and a combustion speed dPB/dt of the second gas generant molded articles is 0.3 to 1.5.

17. The gas generator according to claim 1, wherein a ratio (dPA/dt)/(dPB/dt) between a combustion speed dPA/dt of the first gas generant molded articles and a combustion speed dPB/dt of the second gas generant molded articles is 0.5 to 1.0.

18. A pretensioner system comprising the gas generator according to claim 1.

19. The gas generator according to claim 1, wherein the first gas generant molded articles contain no smokeless powders, and the second gas generant molded articles contain neither a fuel component including a guanidine derivative and/or a tetrazole derivative, nor an oxidizing agent component containing a perchlorate.

20. A gas generator for generating gas for a gas actuator for operating a safety device, the gas generator comprising:
    an igniter having an ignition agent; and
    a combustion chamber containing first gas generant molded articles containing a fuel component including a guanidine derivative and/or a tetrazole derivative, and an oxidizing agent component containing a perchlorate, and second gas generant molded articles containing smokeless powders including nitrocellulose as the major ingredient,
    wherein the first and second gas generant molded articles in the combustion chamber are arranged to be ignited by burning of the ignition agent,
    wherein the fuel component of the first gas generant molded articles has a composition different from the fuel component of the second gas generant molded articles, the first and second gas generant molded articles are each shaped in a granular form, a flake form, a pellet form, a tablet form, a multi-perforated cylinder form, a cylindrical form, or a single perforated cylinder form, and are mixed with each other to fill up the combustion chamber.

21. A pretensioner system comprising the gas generator according to claim 20.

22. The gas generator according to claim 20, wherein the first gas generant molded articles contain no smokeless powders, and the second gas generant molded articles contain neither a fuel component including a guanidine derivative and/or a tetrazole derivative, nor an oxidizing agent component containing a perchlorate.

* * * * *